Feb. 6, 1934.　　　　J. H. LONG　　　　1,946,407
HEATER
Filed March 15, 1933　　2 Sheets-Sheet 1
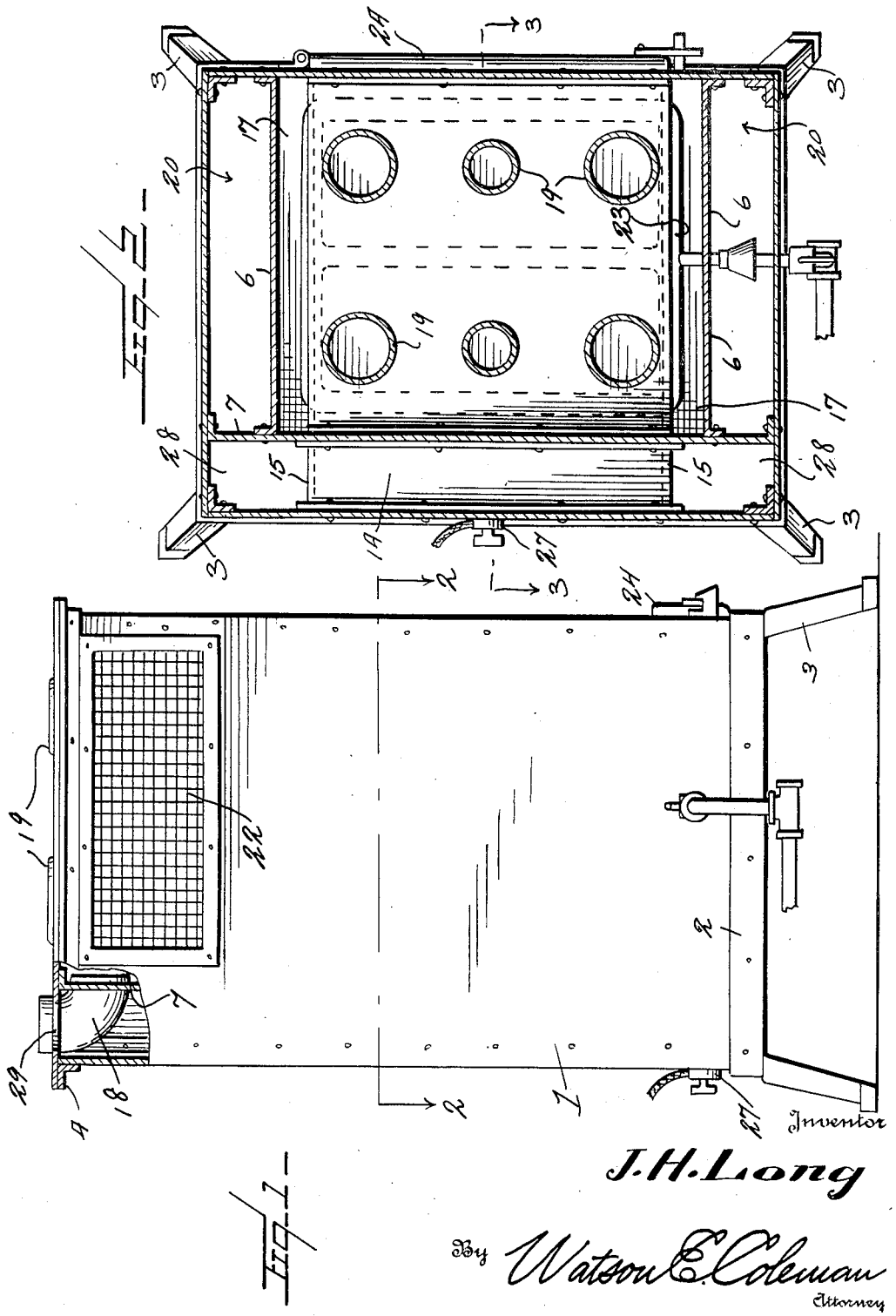

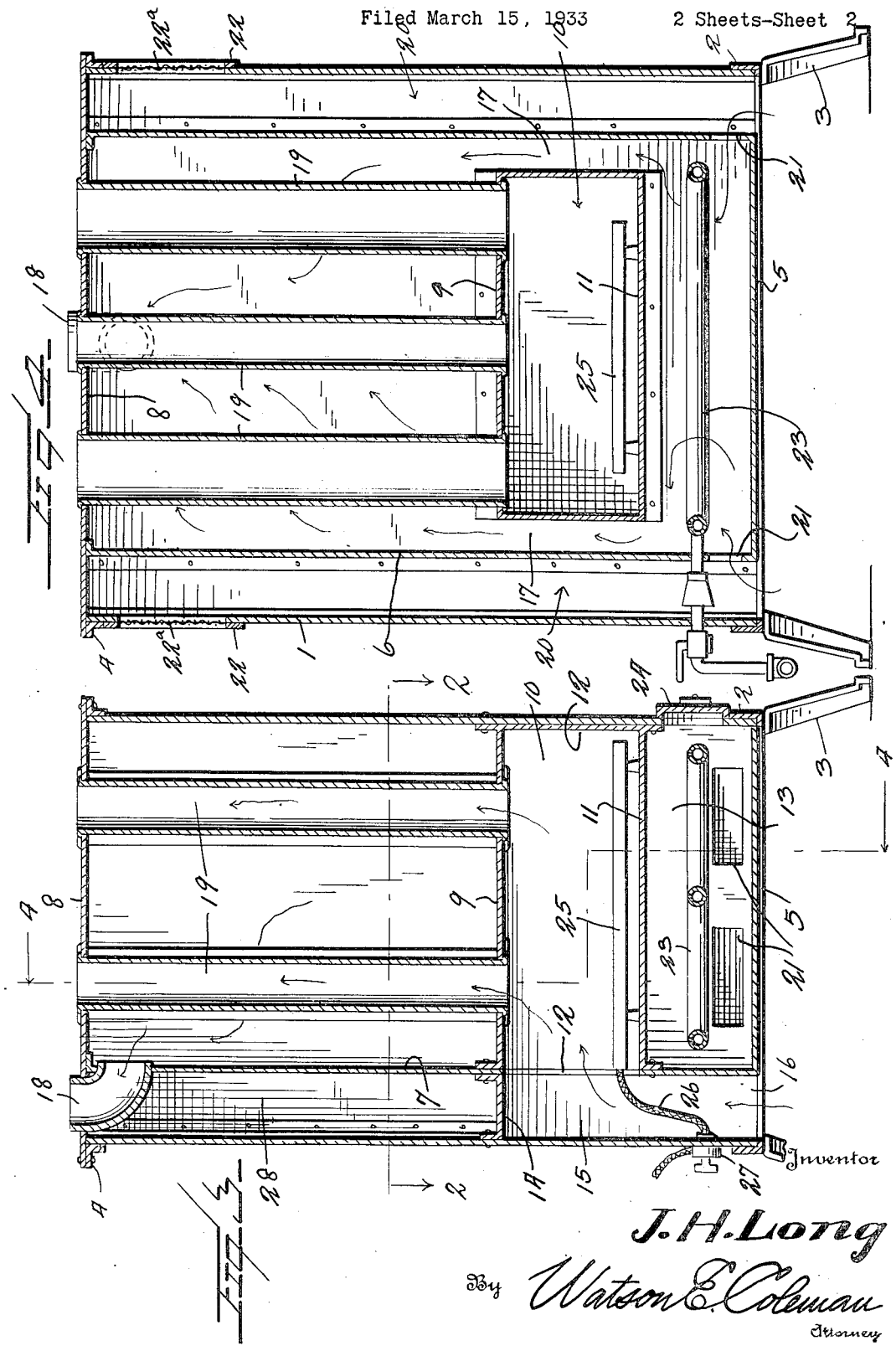

Patented Feb. 6, 1934

1,946,407

UNITED STATES PATENT OFFICE 1,946,407

HEATER

Joseph H. Long, Cleveland, Ohio

Application March 15, 1933. Serial No. 660,945

7 Claims. (Cl. 126—90)

This invention relates to heaters of that type in which air is caused to pass vertically through the heater and particularly to certain improvements on the heater shown in my application for patent 574,196 filed November 10, 1931, of which application this is a continuation in part.

The general object of the invention is to provide a simple and relatively inexpensive heater of this character which will have a maximum heating effect with a minimum expenditure of fuel.

A further object of the invention is to provide a heater of this character which may be inexpensively made, which has no complicated parts or castings, in which the products of combustion cannot pass into the room, but in which the air is caused to travel upward through the bottom of the heater through a more or less circuitous course so as to secure a maximum of heat transfer.

A further object is to provide a heater of this character which includes an outer shell or casing and an inner casing which may be readily inserted within the outer casing or may be removable therefrom.

My invention is illustrated in the accompanying drawings, wherein:—

Figure 1 is a side elevation of a heater constructed in accordance with my invention;

Figure 2 is a transverse section on the line 2—2 of Figure 1;

Figure 3 is a vertical section on the line 3—3 of Figure 2;

Figure 4 is a vertical section on the line 4—4 of Figure 3.

The heater comprises an outer shell or body 1 made from light, sheet metal and is rectangular in plan and elevation. The lower end of the body is reinforced by the angle irons 2 to which the legs 3 of the heater are attached. The upper end of the body is reinforced by angle irons 4.

Adapted to be disposed within the outer shell 1 is an inner casing comprising the bottom wall 5, the side walls 6, and the rear wall 7. The side walls 6 are disposed as shown in Figure 2 inward of the ends of the rear wall 7, this rear wall having a length approximately equal to the width of the outer casing, this rear wall being flanged at its extremities so as to fit against and be bolted or riveted to the outer casing. The side walls are flanged for bolting or riveting to the rear wall 7 and to the front wall of the outer casing 1.

Extending over this inner casing and connected to the side wall 6 and to the rear wall 7 is a top 8 which is attached to the walls 6 and 7 in any suitable manner and which when the inner casing is in place within the outer casing rests upon and is preferably bolted to the angle irons 4. Attached to the rear wall 7 and extending through to the front wall of the outer shell 1 are the walls 9 of an air chamber designated 10, the bottom wall of this chamber being designated 11. This chamber is closed at its forward end by a wall 12 which is preferably bolted to the front wall of the outer shell 1, though it may be riveted thereto, as shown in Figure 3. This air chamber 10 at its rear end is attached to the rear wall 7 of the inner casing, this rear wall being cut away at 12, the opening thus formed being of the same area as the cross sectional area of the chamber 10. A burner compartment 13 is thus formed between the bottom 5 of the outer shell or casing and the bottom 11 of the air chamber.

Extending across the space between the rear wall of the outer casing and the rear wall 7 of the inner casing is an inverted approximately U-shaped flue plate 14 which may be riveted to the inner casing and bolted to the rear wall of the outer casing or shell or attached in any suitable manner, this flue plate having downwardly extending side walls 15 which extended down to the lower end of the outer shell. There is thus provided an air entrance opening or draft opening designated generally 16 which extends upward through the bottom of the outer shell and opens into the rear end of the air chamber 10. The air chamber 10 is less in width than the distance between the side wall 6 of the inner casing so that flues 17 are provided at each end of the air chamber through which the products of combustion from the burner compartment 13 may rise as shown by arrows in Figure 4 into the space above the air chamber and out through a flue 18 extending through the upper end of the wall 7 and upward through the plate 8. This flue may be connected by ordinary stove piping to a chimney. All the products of combustion escape through this flue.

Extending downward from the upper plate or top 8 and through the wall 9 of the air chamber 10 are a plurality of air pipes 19 shown as six in number though I do not wish to be limited to this.

These pipes 19 open at their lower ends into the air chamber and at their upper ends through the top plate 8 so that the air passing upward through the air inlet passage 16 is deflected by the flue plate 14 forwardly into the air chamber 10 and then passes up through the air pipes 19 and so into the room. Between the side walls 6 of the inner casing and the side walls of the outer casing, vertical air spaces are provided designated 20 which are open at their lower ends as shown in Figure 4 for the inlet of air. The walls 6 at their lower ends are provided with openings 21 leading into the burner compartment 13 and thus air is provided for combustion. The upper ends of the side walls of the outer shell are provided with air outlet openings 2 having grids or wire netting panels inserted therein designated 22a. Thus air passes up through these passages 20 being heated by contact with the walls 6 and passes out into the room through the openings 2 while at the same time air is passing in at the rear of the heater, carried into the air chamber 10 and carried upward through the heating pipes 19 and discharged into the room.

The space 28 above the flue plate 14 at the rear of the heater may be provided with a plurality of openings, one of which is shown in Figure 1 and designated 29 from which air heated within the space 28 may pass upward into the room, these openings being disposed one on each side of the flue 18.

I do not wish to be limited to any particular burner or other source of heat designed to be used with this heater or stove.

I have illustrated, however, a gas ring designated 23 as being disposed within the heater compartment 13 immediately below the lower wall 11 of the air chamber 10, this gas ring being connected by any suitable valved connections to a gas pipe. A door 24 at the front of the outer shell permits access to be had to the burner for the purpose of lighting it or cleaning it, if necessary. Under some circumstances, it may be desirable to provide both for electrically heating the air within the air chamber 10 or heating it by means of the burner 13 and I have illustrated an electric heater 25 of any usual or suitable character as disposed within the air chamber 10 and as being connected by the connections 26 to a switch 27. It is to be understood that an electric heater might be used within the space 13 or within the chamber 10 and that this electric heater may be used either by itself or in conjunction with the burner 23. It is further to be understood that I do not wish to be limited to the use of either a gas heater or an electric heater and that it is within the purview of my invention to use any heating means for the purpose of heating the air in the chamber 10.

It will be seen that I have provided a heater which is particularly adapted for household use and which is peculiarly adapted for use with gas, oil or electricity as a heating medium, that the heater can be very cheaply made, and that it provides for dividing the air passing upward through the heater into a plurality of streams each of which is so conducted upward through the heater that it will receive a maximum amount of heat from the heating element. Furthermore, it will be obvious that the heater may be readily assembled and if necessary disassembled and that parts may be readily repaired or replaced.

It will be seen from Figures 3 and 4 that an air circulating space is left between the electric heater 25 and the bottom 11 of chamber 10 so that the air circulating between the heater and the bottom 11 will prevent any burning or undue heating of the electric heater and it is obvious that the electric heater may be insulated from the bottom 11 by insulating material applied to the bottom of the electric heater. By the use of this electric heater I can either provide for a very high degree of heat by using the heater and burner both or I can use the burner alone or use the electric heater alone to secure a relatively low degree of heat. Thus the stove is adapted to all necessities of operation. While the main heating effect is secured by the air which passes into the chamber 10 and up through the air pipes 19, yet some of the heat will, of course, rise upward in the compartments 20 but these compartments are more for the purpose of preventing persons becoming burned by contact with the stove or preventing the stove from setting fire to adjacent objects.

While I have illustrated certain details of construction and arrangements of parts, I do not wish to be limited thereto as obviously many changes might be made therein without departing from the spirit of the invention as defined in the appended claims.

What is claimed is:—

1. A heater including an outer shell open at its top and bottom, an inner casing of less cross sectional area than the outer shell and having side walls, a bottom wall and a rear wall, the side walls and rear wall being conterminous with the walls of the outer shell, a top wall extending over the upper end of the outer shell, an air chamber open at one end and disposed within the inner casing attached to the rear wall thereof but opening therethrough, air tubes opening at their lower ends through the top wall of the air chamber and at their upper ends extending through the top wall of the outer shell, an approximately inverted U-shaped flue plate extending between the rear wall of the inner casing and the rear wall of the outer shell, and constituting an air inlet duct to the air chamber, and heating means disposed below the air chamber.

2. A heater including an outer shell rectangular in plan and having front, rear, side and top walls, a vertical partition extending downward parallel to one of said walls and spaced therefrom and constituting an air inlet duct, an air chamber opening at one end through said partition into said duct and closed at its opposite end, air tubes extending upward from the air chamber and discharging through the top wall of the outer shell, a plate extending across the air duct deflecting air entering the lower end of the duct into the air chamber, and heating means disposed to heat the air chamber.

3. A heater comprising an outer shell rectangular in plan and having front, rear, side and top walls, a vertical partition extending downward parallel to the rear wall of the outer shell and spaced therefrom and constituting an air inlet duct, an air chamber opening at one end through said partition and closed at its opposite end, air tubes extending through the air chamber and discharging through the top wall of the shell, a deflector extending across the air duct and deflecting the air entering the lower end of the duct into the air chamber, vertical partitions disposed on each side of the air chamber and extending from top to bottom of the heater and spaced from the side walls of the outer shell and defining air ducts open at their lower ends and opening at their upper ends to the exterior of the outer shell and having openings into the space below the air chamber, and heating means disposed in connection with the air chamber.

4. A heater comprising an outer shell rectangular in plan and having front, rear, side and top walls, a vertical partition extending downward from the top wall parallel to the rear wall of said shell, and spaced therefrom and defining a rear, air inlet duct, vertical partitions extending parallel to the side walls of the outer shell and within the outer shell but spaced therefrom to constitute lateral air ducts having openings through the top wall of the outer shell and open at their lower ends, an air chamber opening at its rear end through said first named partition and into the first named air duct and closed at its forward end, air pipes extending upward from the air chamber and discharging through the top wall of the shell, an approximately inverted U-shaped, flue plate disposed in the first named air duct and opening at its lower end through the bottom of the shell whereby to deflect air entering through the bottom of the outer shell into said air chamber, a flue leading from the upper end of the inner casing, and heating means disposed below the air chamber.

5. A heater comprising an outer shell open at the bottom and closed at the top, an inner casing within the shell constituting a combustion chamber and having a closed bottom and having the vertical walls abutting against the top of the shell, an outlet for said chamber, an air heating chamber extending across the first chamber and opening through a wall of the casing into the space between the casing and the shell, a heating element below the heating chamber, and heater tubes extending through a combustion chamber above the heating chamber, one end of the tubes being connected to the top wall of the heating chamber and the other being secured to the top wall of the shell and opening into the atmosphere therethrough.

6. A heater comprising an outer shell open at the bottom and closed at the top, an inner casing within the shell and having certain walls thereof spaced from the outer shell whereby to provide an air space between the outer shell and the casing, said casing constituting a combustion chamber and having a closed bottom with the vertical walls abutting against the top of the shell, an outlet for said chamber, an air heating chamber extending across the first chamber and opening through a wall of the casing into the air space between the casing and the shell, a heating element below the heating chamber, and heater tubes extending through the combustion chamber above the heating chamber, one end of the tubes being connected to the top wall of the heating chamber and the other end being secured to the top wall of the shell and opening into the atmosphere therethrough.

7. A heater comprising an outer shell open at the bottom and closed at the top, an inner casing within the shell constituting a combustion chamber and having a closed wall and certain of the vertical walls spaced from the outer shell and abutting at the upper end thereof against the top of the shell, an outlet for said chamber, an air heating chamber extending across the first chamber and opening through a wall in the casing into the space between the casing and the shell, means opposing the opening in said heating chamber for securing the chamber to a wall of the shell, a heating element below the heating chamber, and heater tubes extending through the combustion chamber above the heating chamber, one end of the tubes being connected to the top wall of the heating chamber and the other end being secured to the top wall of the shell and opening into the atmosphere therethrough.

JOSEPH H. LONG.